United States Patent [19]
McMullen

[11] 4,270,724
[45] Jun. 2, 1981

[54] HOLDING DEVICE

[76] Inventor: Donald A. McMullen, 2143 Hulton Rd., Verona, Pa. 15147

[21] Appl. No.: 42,018

[22] Filed: May 24, 1979

[51] Int. Cl.³ .......................................... F16M 13/00
[52] U.S. Cl. ................................ 248/534; 248/226.2; 248/226.3; 248/311.2
[58] Field of Search ............... 248/219.3, 219.4, 226.2, 248/226.3, 534, 538, 540, 541, 313, 311.2; 211/71, 72

[56] References Cited
U.S. PATENT DOCUMENTS

| 849,727 | 4/1907 | Crary | 248/226.3 |
| 1,162,608 | 11/1915 | Hohl | 248/540 X |
| 2,995,333 | 8/1961 | Pazzano | 248/311.2 X |
| 3,233,853 | 2/1966 | Majewski | 248/219.3 |
| 3,494,582 | 2/1970 | Nemeth | 248/219.3 X |
| 3,508,732 | 4/1970 | Trachtenberg et al. | 248/311.2 X |
| 3,564,753 | 2/1971 | Fravel | 248/538 X |
| 3,568,970 | 3/1971 | Mallett | 248/311.2 |
| 3,746,294 | 7/1973 | Johnston | 248/219.4 |
| 3,765,635 | 10/1973 | Burrell | 248/313 |
| 3,913,878 | 10/1975 | Wayne | 248/311.2 |

Primary Examiner—William H. Schultz
Attorney, Agent, or Firm—Richard R. Mybeck

[57] ABSTRACT

A device to enhance the utility of a folding chair in outdoor recreational activities, such as fishing and the like, comprising a bracket member attachable to a portion of said chair and extendible therefrom to provide secure detachable support for a fishing pole holder, a drink holder and an ashtray or any combination thereof.

4 Claims, 7 Drawing Figures

HOLDING DEVICE

BACKGROUND OF INVENTION

This invention relates to new and useful improvements in holding devices for use in conjunction with a foldable outdoor chair whereby the sportsman using said chair may support a fish pole or rod, a drink and a cigarette or any combination thereof, thereby freeing his hands for other activities.

Based on years of personal experience and observation, I believe that the majority of today's fishermen prefer to fish from a riverbank, lake or ocean shore while seated in a foldable chair such as those aluminum tubular chairs commonly sold for patio and garden use. However, among the most annoying problems facing such a fisherman is what to do with the pole after casting the bait into position and while waiting for a strike. Some fishermen have been seen to solve the problem by piling rocks on the handle of their poles while others use a combination of a forked stick and rock, and still others, in desperation, simply lay their poles on the ground. Obviously none of these solutions is wholly satisfactory.

Nor are the devices such as those taught by Nebergall et al (U.S. Pat. No. 2,693,660) and Fravel (U.S. Pat. No. 3,564,753) completely satisfactory because each is specifically designed for attachment to the gunwall of a row boat and do not lend themselves to on-shore use.

Another annoyance accompanying the fisherman, who has usually located himself on an irregular or sloping surface contiguous to the water, is the lack of a suitable place to set his can of soda or beer or his glass of other liquid refreshment if, during a lunch break or the like, it is essential that he use both hands to bring home a welcome visitor to the end of his line. The current practice of setting it "somewhere" just doesn't work well because usually "somewhere" isn't level and the beverage is usually spilled. Similarly, an appropriate resting place for a cup of live bait such as worms is also frequently needed.

A further annoyance to those anglers who still smoke is the lack of a suitable place to rest or snuff out smoking items such as cigars or cigarettes or the like, when again, the task of landing a catch requires the use of both hands. Nor is clenching the item between one's teeth a satisfactory alternative because without a free hand to maneuver the cigarette, the fisherman could burn his lips from too short a smoke or the smoke emitting therefrom could obstruct his vision and abort the catch. Nor is placing a cigarette on a nearby rock or the ground a satisfactory alternative when the area contains dry tinder-like materials which could flare. Nor is the pollution of our waterways by casting the burning item thereinto a satisfactory alternative because most outdoorsmen are keenly sensitized to the evils of such a form of pollution.

Thus a need exists for a device which can accompany a fisherman into the wilderness which will allow him to support his fishing pole during the wait between strikes and which, upon detecting a strike, will allow him to quickly and safely free his hands from drinking or smoking articles so that he may adroitly, and without the distraction of spilled liquids or smoldering mulch, bring home his catch.

Accordingly, one of the prime objects of the present invention is to provide a simple-to-use, inexpensive-to-manufacture, easy-to-carry, quick-to-install, multi-purpose device which provides a fisherman seated in a foldable chair or the like a readily accessible support for his fishing pole, his drink, his bait and his smoking materials or any of them as the need arises.

Another object of the present invention is to provide an efficient pole holder which secures the pole in proper position while allowing for the quick removal of the pole therefrom without slackening of the line or damaging the reel when a fish strikes.

Still another object of the present invention is to provide a novel device which includes in combination a support bracket to which may be readily affixed an efficient and accessible pole holder, and a drink support which avoids spillage of a receptacle placed thereupon even during the excitement and movement which occurs when a fish strikes the bait.

A further object of the present invention is to provide a novel device including in novel combination with a support bracket, a pole holder and a drink support, a tray-like member having the ability to receive and hold burning smoking materials and the ashes therefrom and to snuff out such materials quickly and safely so as to avoid igniting surrounding brush.

Still another object of the present invention is to provide a novel device including in novel combination with a support bracket, a pole holder, a drink support, and a tray-like member for receiving and holding smoking material, or any desired combination thereof to enable owners of foldable lawn chairs to maximize the enjoyment thereof.

These and still further objects of the present invention as shall hereinafter appear, are fulfilled by the present invention in a remarkably unexpected fashion as can be readily discerned from a careful consideration of the following detailed description of the invention, especially when read in conjunction with the accompanying drawing in which like parts bear like numerals throughout the several views.

Figure 1:
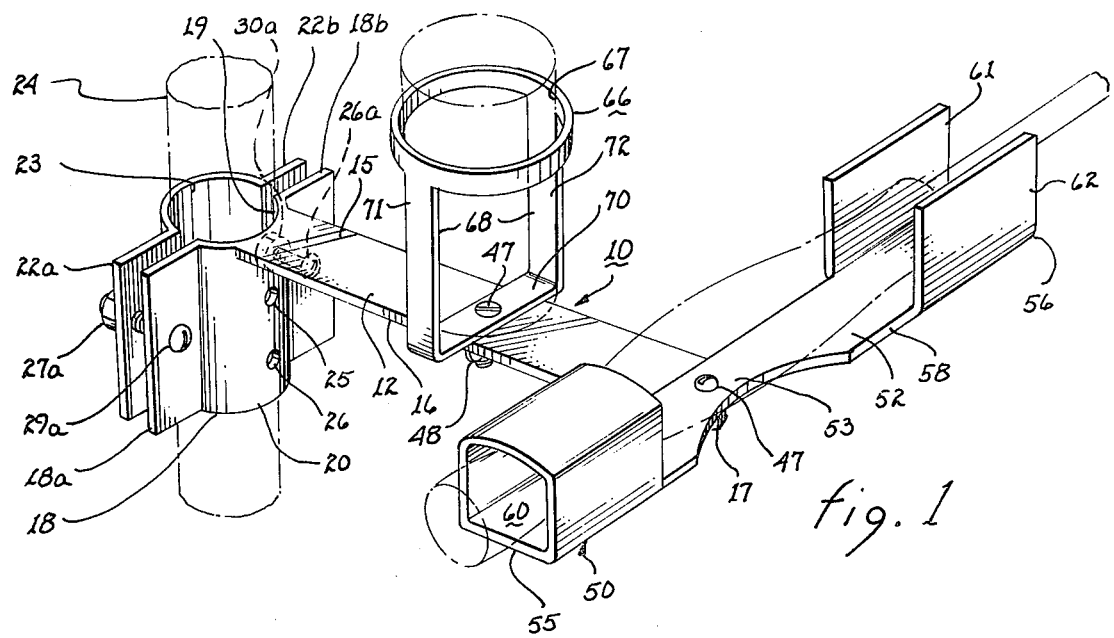
FIG. 1 is an isometric view of a support assembly embodying the present invention mounted to a tubular chair leg by either of two optional mounting means and including optional attachments in place thereupon.

Referring now to the drawing, and especially FIG. 1, an assembly 10 embodying the present invention comprises a support bracket 12 having a horizontally extending body portion 14 and, at one end thereof, a downwardly extending flange 18.

Body portion 14 presents an upper surface 15 and a lower surface 16.

Flange 18, having a forward surface 19 and a rearward surface 20, coacts with complementary plate member 22 to provide means for attaching assembly 10 to the leg 24 of an adjacent chair.

When leg 24 is of a tubular shape, as is common in the commercially available aluminum folding chairs sold widely for patio and lawn use, surface 19 of flange 18 and the facing surface 23 of plate 22 may each be provided with arcuate contours (as shown in FIG. 1) to engage chair leg 24 and are secured thereto by drilling holes 25, 26 through flange 18, plate 22 and leg 24 and passing suitable threaded bolts 27, 28 therethrough to be secured by nuts 29, 30 respectively. When leg 24 is of a rectangular cross section (see FIG. 2), face 19 of flange 18 and surface 23 of plate 22 will preferably be planar or flat and the same method of attachment used.

When it is desired to avoid drilling permanent holes through chair leg 24, flange 18 and plate 22 may be provided at each edge thereof with outwardly extending ears such as 18a and 18b for flange 18 and ears 22a and 22b on plate 22. As shown in FIG. 1, ears 18a and 22a mate in complementary engagement with each other at one side of leg 24 while ears 18b and 22b match in a similar manner at the other side of leg 24 and the device is secured without invading or marring the surface finish of the chair. In my preferred assembly of this mounting means, the plane of engagement between the complementary ears will fall onto a common diameter of a circular leg 24.

To secure each pair of ears in the aforedescribed mating relationship, a hole 25a is drilled through ears 18a, 22a and a second hole 26a is drilled through ears 18b, 22b and bolts 27a, 28a are respectively passed therethrough and secured by their respective nuts 29a, 30a to hold assembly 10 to leg 24.

Figure 2:
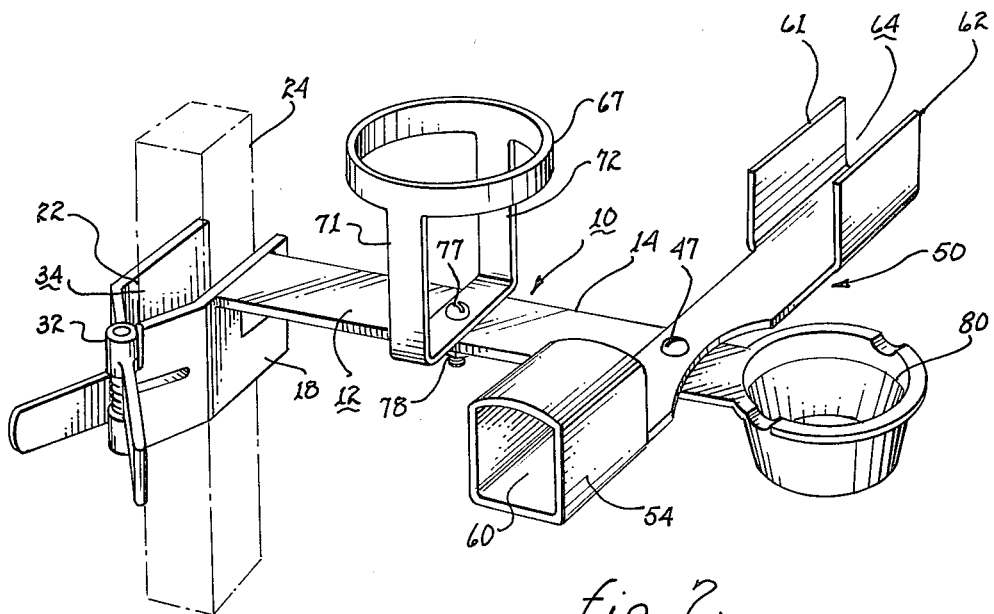
FIG. 2 is an isometric view of another support assembly embodying the present invention showing all the optional attachments and adapted for use with a chair presenting a flat surface.

In still another embodiment as shown in FIG. 2, assembly 10 may be secured to leg 24 by the operative interposition of a suitable spring mechanism 32 at the junction between flange 18 and plate 22 which coacts therewith to define a spring-biased clamp 34.

Figure 3:
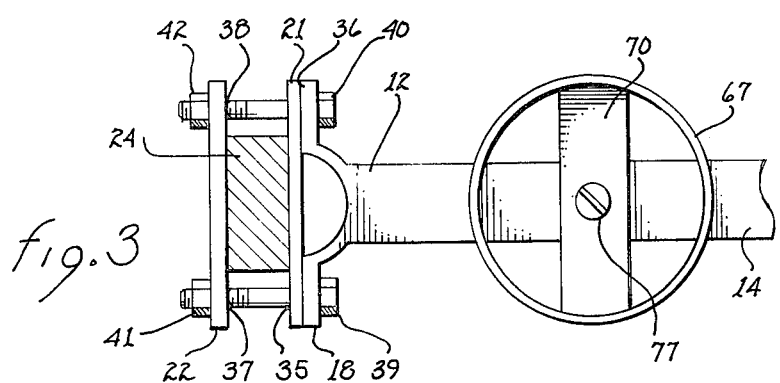
FIG. 3 is a fragmentary top view of alternate means of securing support bracket to a flat-surfaced chair leg.

However, when used by an avid fisherman, such as myself, I find it easier to have flange 18 and plate 22 oversize relative to the width (or diameter) of chair leg 24 and I drill a pair of laterally spaced holes 35, 36 in ears 18a, 18b of flange 18 and a like pair of holes 37, 38 in ears 22a, 22b in plate 22 in such a manner that threaded bolts 39, 40 when passed through holes 35, 37 and 36, 38 respectively, do not touch the leg 24. With bolts 39, 40 thus placed, I secure assembly 10 to leg 24 by placing suitable nuts 41, 42, respectively on bolts 39, 40 and tightening them until they are secure. Thus I achieve my result without permanently altering the chair. As shown in FIG. 3, a modification of the attachment shown in FIG. 1 is achieved for mounting the bracket to chairs having legs of rectangular section by the inserting of a thin flat plate 21 between flange 18 and chair leg 24.

Figure 7:
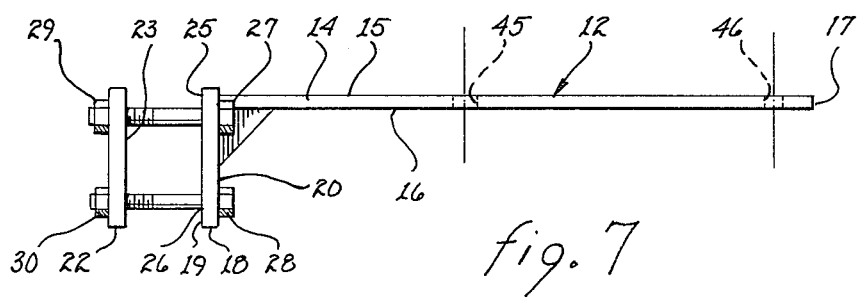
FIG. 7 is a side elevation, partially in section, of still another support bracket embodying the present invention.

Of course, when a chair is permanently placed in one's fishing gear, drilling holes 25, 26 directly through leg 24 as shown in FIG. 7 is no great hardship and when done, plate 22 may be replaced by a pair of large washers (not shown) or like retaining members. Or, if desired, other known arrangements for detachably securing one member to another can also be incorporated with flange 18 without departing from the intended spirit of this invention.

As will appear hereinafter in greater detail, support bracket 12 is adapted to accept the installation of one or more unique attachments, such as fishing pole holder 50, glass holder 66, and ash tray 80.

A first and second aperture 45, 46 is drilled or otherwise defined into body portion 14 in spaced relationship to each other, preferably one, 45, being located along the axial centerline of surface 15 between flange 18 and the midpoint of body portion 14 while the second, 46, is located adjacent the distal end 17 thereof.

Each aperture 45, 46 is adapted to cooperate with a suitable attachment device such as bolt 47 and nut 48 for securing a preselected attachment to support bracket 12 and likewise is adapted to receive therethrough a threaded boss defined hereinafter as dependent from certain attachments and attachable by the threading of a nut thereupon.

Figure 4:
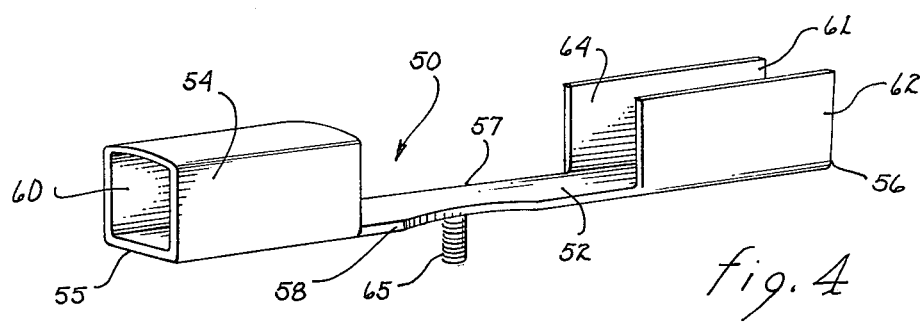
FIG. 4 is an isometric view of a fish pole holding attachment for use in the assembly.
Figure 5:
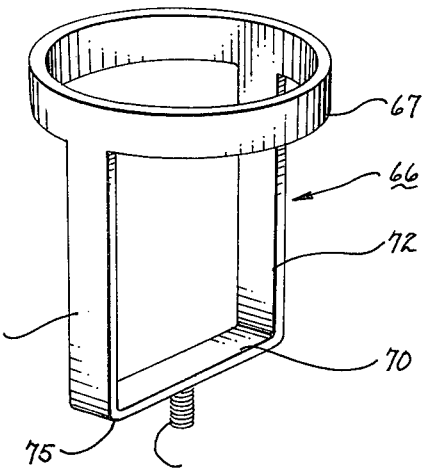
FIG. 5 is an isometric view of a container holding attachment for use in the assembly.
Figure 6:
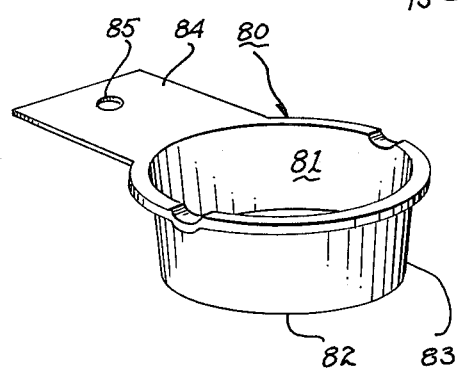
FIG. 6 is an isometric view of an ash tray attachment for use in the assembly.

As shown in FIGS. 1, 2 and 4, fishing pole holder 50 comprises an elongated base plate 52. In FIGS. 1 and 2, plate 52 has an aperture 53 defined therethrough on the longitudinal axis but transversely thereof and approximately between its ends 55, 56 and edges 57, 58. Adjacent one end 55 of plate 52, an inverted U-shaped bracket 54, is attached adjacent edges 57, 58 as by welding, to define an opening 60 for receiving the butt of a fishing rod or pole. At the other end 56 of plate 52, a pair of upstanding members 61, 62 are attached, as by welding, adjacent edges 57, 58 respectively, and extend upwardly therefrom in generally normal relationship to plate 52 in spaced generally parallel relationship to each other to define therebetween a slot 64 which receives and holds the shank of a fishing pole or rod. In an alternative embodiment as shown in FIG. 4, aperture 53 can be omitted and downwardly depending threaded boss 65 can be provided base plate 52 for use as will hereinafter be described.

Glass holder 66 comprises an annular member 67 supported by U-shaped member 68 having a base portion 70 and spaced generally parallel upreaching arm portions 71, 72 attached at opposite sides of annular member 67 and supporting annular member 67 in spaced relationship to base portion 70 whereupon a glass, can or other container placed through annular member 67 to rest upon base portion 70 is prevented from sliding or spilling. As will hereinafter appear, holder 66 is located in its desired position upon body portion 14 by the provision of a suitable aperture 73 substantially in the center of base portion 70 along the axial center line thereof. Alternatively, locator means such as threaded boss member 74 is provided in depending relationship from and substantially in the center of the bottom surface 75 of base portion 70 and along its axial center line.

When the former construction is employed, a suitable threaded bolt 77 is passed through aperture 73 and the corresponding one of said apertures 45, 46 in body portion 14 (depending on where the user desires his holder but normally through aperture 45) and engaged by a suitable nut 78 threaded tightly thereupon. In the latter construction, threaded boss 74 is set into and extends through the desired aperture, for instance aperture 45, then the nut 78 is screwed tightly thereupon.

Ash tray 80 comprises a suitable dished out receptacle portion 81 which may be of any geometric configuration desired to provide a bottom surface 82 surrounded by an upstanding perimetrical flange 83. An elongated lateral flange 84 extends outwardly from the top of flange 83 and is suitably provided with an aperture 85 which functions to position ash tray 80 on body portion 14 when aperture 85 is aligned with a suitable one of said apertures, for instance aperture 46, in body portion 14 for receiving a suitably threaded bolt 86 therethrough upon which is thereafter threaded an appropriate nut 87. As will hereinafter appear, apertures 85 and 45 or 46, can also be used to receive and pass through the locator means of another attachment, for instance, member 74 of glass holder 66 or boss member 65 of fishing pole holder 50, and both attachments are secured when the corresponding nut is tightened thereupon.

When in use by a fisherman who has included both drink and smoking materials in his pack, assembly 10 is secured to the leg 24 of a suitable folding or portable chair by engaging flange 18 and plate 22 on opposite sides of leg 24, passing bolts 27, 28 respectively through holes 25, 26 and tightening the corresponding nuts 29, 30 until surfaces 10 and 23 tightly engage leg 24 and securely connect support bracket 12 in place. Next, glass holder 66 is placed in a position to align aperture 73, defined in base portion 70, with aperture 45, of body portion 14. Then, holder 66 and body portion 14 are secured to each other by passing threaded bolt 77 through apertures 73, 45 and threading a suitable nut 78, such as the wing nut shown, onto bolt 77 until it is tightly engaged with the lower surface 16 of body portion 14.

Next, fish pole holder 50 and ash tray 80 are mounted upon body portion 14 by aligning first aperture 85 and the aperture 53 with aperture 46. Preferably, holder 50 is placed to extend transversely of body portion 14 and tray 80 is placed to extend axially of body portion 14. When apertures 85, 53 and 46 are thus aligned, the assembly is completed by passing threaded bolt 47 downwardly through the aligned apertures 85, 53 and 46 and nut 48 is threaded upon the protruding portion thereof until it can be turned no further and the attachments are snugly secured in their preselected positions. Alternatively, one first aligns aperture 85 with aperture 46 and thereafter passes threaded boss 65, depending from the bottom surface of base plate 52, through both of the aligned apertures 85, 46 to provide a protrusion therebeyond on which a suitable nut (not shown) is threaded to secure the combination of holders tightly in place.

Of course, the assembly of the present invention can be varied to provide arrangements other than the one described to suit the particular needs of the user. For example, if the fisherman is a non-smoker, ash tray 80 can be omitted from the assembly. Or, if a smoker prefers his ash tray 80 closer to him, ash tray 80 can be placed in operative position to align aperture 85 with aperture 45 in body portion 14 and secured thereto in the same manner already described for attaching glass holder 66 thereto, including the simultaneous attachment therewith as previously described relative to ash tray 80 and fish pole holder 50.

When assembled in the manner indicated, the user rests his fishing pole (as shown in FIG. 1) by placing the butt of the pole handle into opening 60, defined by bracket 54 and body portion 14, and laying the shank of the pole into the slot 64 defined intermediate flanges 61, 62. A glass of cola, cup of worms, can of beer and the like are located and maintained safe by placing the glass through annular member 67 into seated position upon base portion 70. The use of the ash tray 80 to hold or extinguish smoking materials is well known and need not be elaborated upon.

It should be understood that while the various parts of the assembly of the present invention as herein described have been characterized in terms of separate metal parts, it is intended that one or more of them may be formed of a durable shock resistant plastic, such as styrene or the like, or of durable woods without departing from the inventive concept of the present invention.

From the foregoing, it thus becomes apparent that a new and improved holding device has been herein described and illustrated which fulfills all of the aforestated objectives in a remarkably unexpected fashion. It is, of course, understood that such modifications, alterations and adaptations, as may readily occur to an artisan having the ordinary skills of the art when confronted with this invention, are intended to fall within the spirit of the present invention which is limited only by the scope of the claims appended hereto.

Accordingly, what is claimed and desired to secure by Letters Patent is:

1. For attachment to a portable chair having a leg of fixed thickness and width, a holding device comprising a bracket having an elongated body portion and a flange portion integrally formed with said body portion and disposed generally normal thereto, said body portion having, along the axial length thereof, a plurality of apertures disposed transversely therethrough in spaced relationship to each other; a plate member generally conforming in size and shape to said flange portion and cooperative therewith to engage said leg therebetween; connecting means detachably securing said bracket to said plate to secure said device to the leg interposed therebetween and support said body portion therefrom; and holder means adapted to support one or more preselected objects in space relationship to said leg, said holder means comprising a base plate having a first end, a second end, locator means formed in said base plate intermediate said ends and extending downwardly therefrom for cooperative engagement in one of said apertures for detachably securing said holder means to said body portion, an inverted U-shaped bracket secured to said base plate adjacent said first end, and a pair of upstanding flanges secured in spaced generally parallel relationship to each other adjacent said second end, said locator means comprising an aperture defined through said base plate on the axial centerline thereof substantially midway between said first and said second end, and a detachably securable bolt extendible through said aperture and one of said apertures in said body portion to attach said holder means to said body portion while permitting the selective pivotal action of said holder relative thereto.

2. A holding device according to claim 1 in which said base portion supports object holding means integrally formed therewith and extending upwardly therefrom.

3. A holding device according to claim 2 in which said locator means comprise a threaded boss integrally formed with and depending downwardly from said base portion for passage through and securable engagement with one of said apertures.

4. A holding device according to claim 1 in which said plate member is pivotally connected with said flange portion to form a spring biased hinge therewith.

* * * * *